United States Patent Office 3,446,336
Patented May 27, 1969

3,446,336
DEVICE FOR FEEDING VENEERS INTO A VENEER COMPOSING MACHINE FOR GLUING VENEERS TOGETHER
Ernst Hunziker, Brugg, Switzerland, assignor to Georg Fischer AG Brugg, Brugg, Switzerland
Filed Dec. 11, 1967, Ser. No. 689,510
Claims priority, application Switzerland, Dec. 16, 1966, 18,098/66
Int. Cl. B65g 47/28; B65h 37/04
U.S. Cl. 198—34       8 Claims

ABSTRACT OF THE DISCLOSURE

Veneer piece feeding device in which veneer pieces are fed in succession along a path with spacer members mounted on carriage members which are freely moveably mounted on endless guiding rails above the path of the veneer pieces. The carriage members are controlled by the movement of the veneer pieces into the device so that the spacer members are interposed between the ends of successive veneer pieces and prevent the said ends from overlapping.

---

The present invention relates to a device for feeding veneers into a veneer composing machine for gluing veneers together in a direction transverse to the direction of the fibers so as to form a veneer web, said device being provided with continuously driven feeding means and with sliding and guiding rails arranged perpendicularly to the feeding direction and adapted to be varied in conformity with the thickness of the material being fed. Swiss Patent No. 336,188 describes a veneer feeding device in which the feeding means comprise upper and lower feeding chains or feeding chains and feeding rollers. Furthermore, above the introducing table there are provided guiding skids which serve for leading together with the two veneer edges which are to be glued together and have already a glue applied thereto.

According to a further heretofore known arrangement described in Swiss Patent No. 429,121, the feeding is effected between lower stationary sliding rails and upper guiding rails which are arranged opposite said lower guiding rails and are adjustable with regard to the desired veneer thickness. More specifically, the said feeding is effected by continously driven lower feeding rollers which are provided with slip clutches and opposite to which there are provided spring biased freely rotatable counter rollers.

Since in the meantime numerous veneer sheets have been fed in highly distorted condition from the drying edge and from the edge cutting and glue applying devices, it can happen, in spite of the provided guiding skids, that during the feeding of the veneer sheets, the joining edges which have glue applied thereto superimpose each other, at least partially, and thus do not abut each other edgewise. This results in faulty veneer bands, which are not usable. This drawback is particularly present with certain types of woods and with thin and very thin veneer sheets.

Attempts have been made to overcome the above-mentioned drawback by providing photoelectric control devices which are controlled by the veneer sheet being fed and which in their turn so control the feeding means that the edges of the veneer sheets to be interconnected will be displaced parallel to each other. Another heretofore known device which is described in German Patent No. 965,354 for the same purpose employs mechanically operable spring biased abutment means.

The above-described veneer sheet aligning devices merely serve to align and feed the respective next following veneer sheet.

If, however, it is desired to operate with joint gluing machines driven at high speed—which do not form the subject matter of the present invention—the heretofore known feeding device will in many instances not operate fast enough. This is particularly true when, for instance, narrow veneer strips are to be processed. In these instances, it is necessary so to design the veneer sheet feeding device that a plurality of sheets can be placed in readiness independently of each other for introduction into the joint gluing device.

It is an object of the present invention to provide a veneer feeding device for a veneer composing machine, which will overcome the above-mentioned drawbacks.

It is another object of this invention to provide a veneer feeding device of the above-mentioned type which will work with high-speed gluing devices and which is reliable in operation.

These and other objects and advantages of the invention will appear more clearly from the following specification in connection with the accompanying drawings, in which.

The veneer feeding device according to the present invention is characterized primarily by a plurality of endless guiding rails arranged above the upper guiding rails for the material to be fed and extending parallel to the direction in which the material to be fed passes through the machine. The said plurality of guiding rails is provided for a number each of carriages which are freely displaceable in said endless rails and respectively comprise spacer means extending into the path along which the material to be fed moves. The device according to the invention is furthermore characterized by a carriage lifting device and by carriage releasing means controlled by the material being fed.

Figure 1:
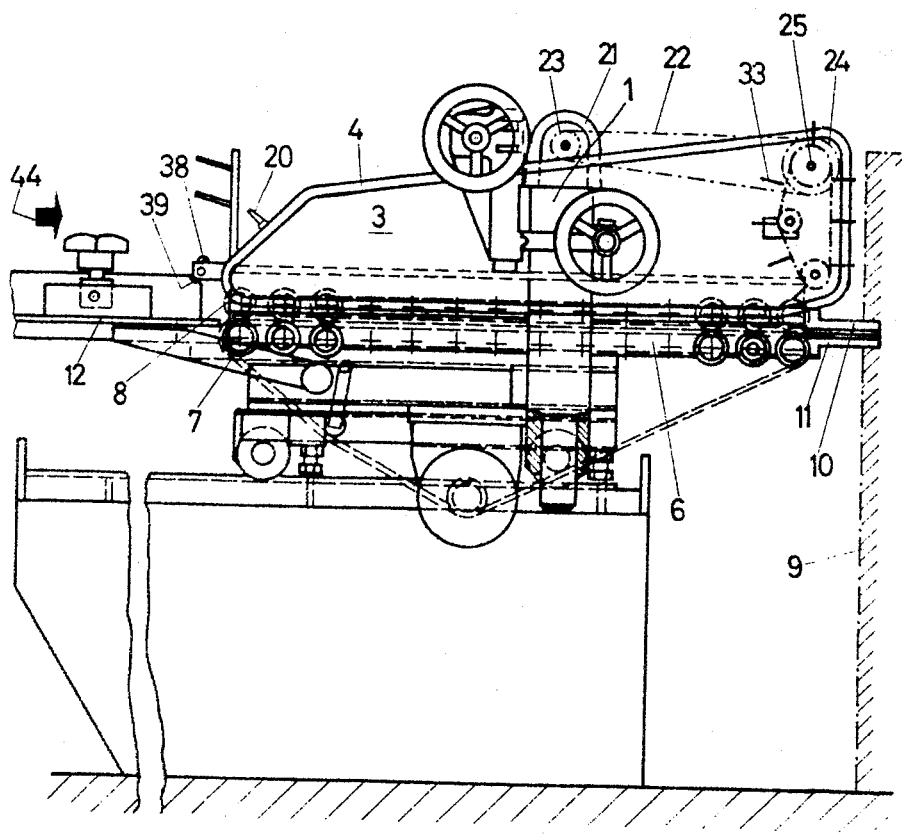
FIGURE 1 is a diagrammatic side view of a veneer feeding device according to the invention.
Figure 2:
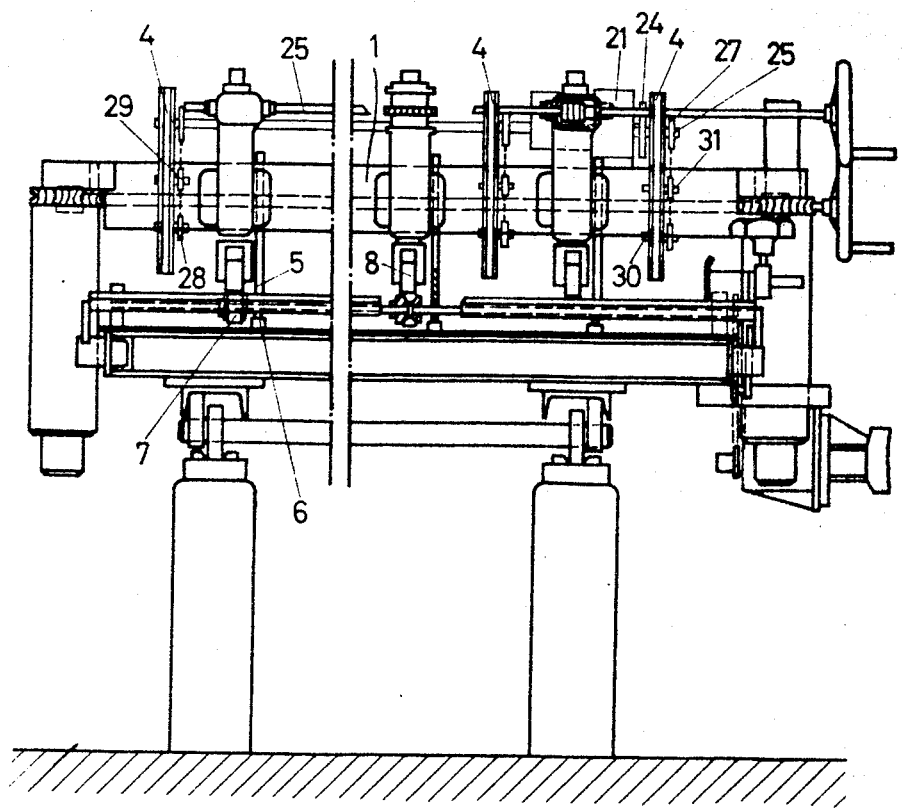
FIGURE 2 is a front view of the machine of FIGURE 1.

Referring now to the drawings in detail, the machine shown in FIGS. 1 and 2 comprises fixed lower guiding rails 6 which extend over the entire length of the machine, and furthermore comprise upper guiding rails 5 adjustable as to height and located opposite to said guiding rails 6. The guiding rails 5 and 6 are intended for guiding the material to be fed, and the vertical distance between said guiding rails 5 and 6 is adjustable in conformity with the thickness of the veneer sheets to be glued.

Figure 6:
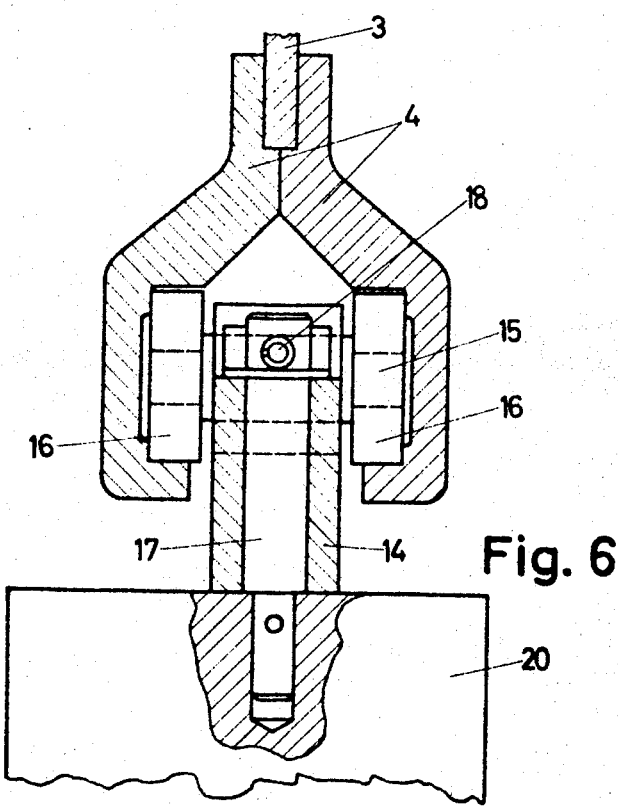
FIGURE 6 represents a section through a guiding rail with a carriage.
Figure 7:
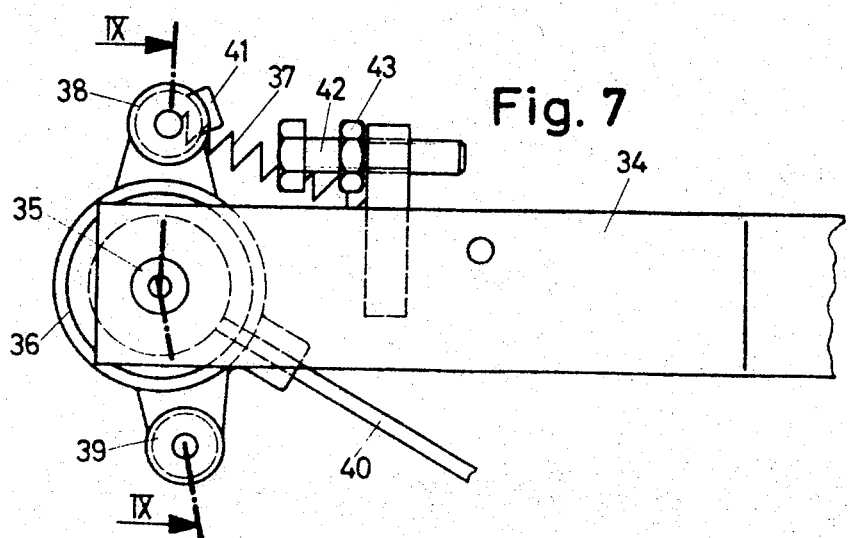
FIGURE 7 is a side view of the release control means.
Figure 8:
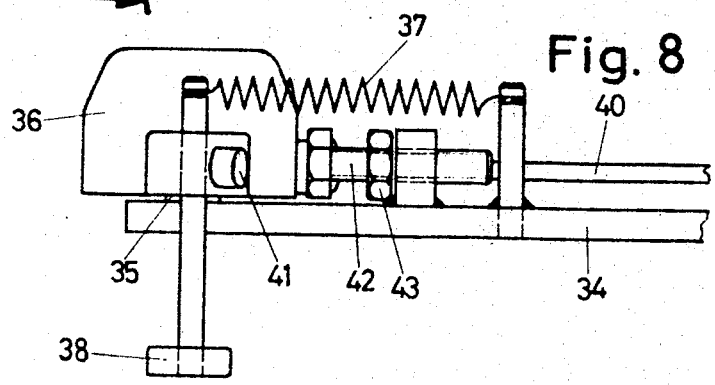
FIGURE 8 is a top view of FIGURE 7.
Figure 9:
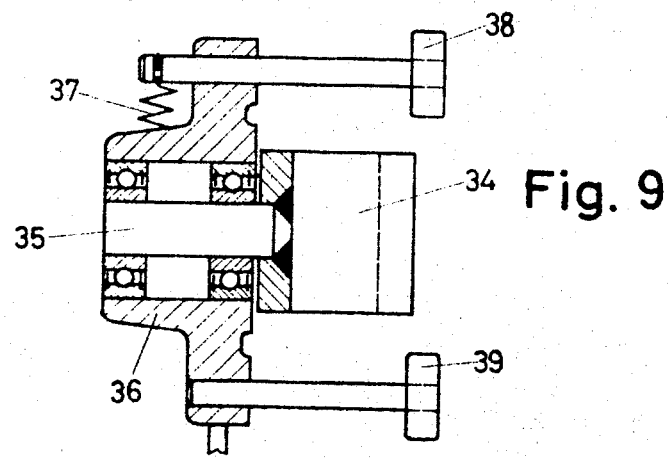
FIGURE 9 is a section along the line IX—IX of FIGURE 7.

The veneer feeding device according to the present invention comprises a transverse beam 1 extending transversely to the feeding device and having arranged thereon a plurality of supportnig sheets 3 which are parallel to each other and parallel to the feeding device of the veneer strips 2. The circumference of each of the supporting sheets 3 is provided with an endless carriage rail 4 which has the shape of approximately a rectangular triangle and which is composed of two sections forming an image to each other. The cross-sectional shape of the carriage guiding rail 4 is more clearly shown in FIG. 6. The lower portion of rail 4 is approximately parallel to a bed of a veneer sheet feeding device which does not form a part of the invention and in which the feeding movement of the veneer sheets is effected by driven rollers 7 and counter idling rollers 8, the said bed being formed by upper and lower guiding rails 5, 6 respectively.

Instead of the illustrated feeding device, it is, of course, also possible to employ other suitable constructions.

At the exit end of the feeding device (FIG. 3) where the material being fed which is composed of individual veneer sheets 2 is grasped by the upper and lower rails 10, 11 respectively, of a transversely joined gluing machine 9 indicated by dot-dash lines, the rail 4 has an approximately vertical portion 4a. From the uppermost portion 4b of said vertical portion 4a, rail 4 is inclined toward the left with regard to FIGS. 1, 3 and 4 and at the said left side is preceded by a feeding table 12.

Figure 5:
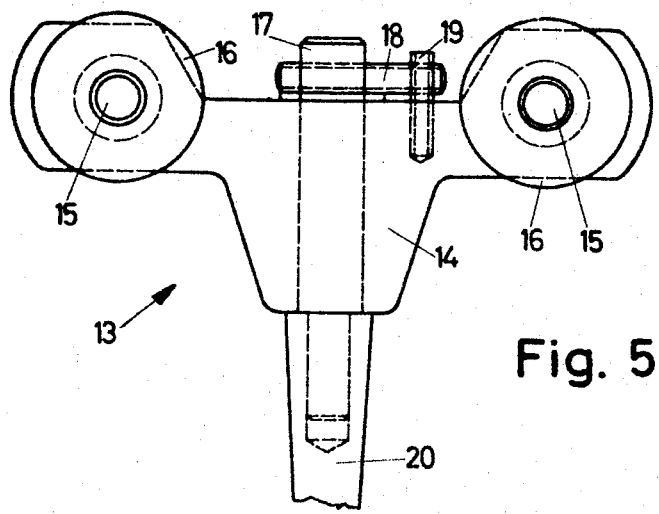
FIGURE 5 is a side view of a feeding carriage.

In the closed circuit of the carriage feeding rail 4 there is freely displaceable a plurality of substantially identical feeding carriages 13. Said feeding carriage 13, which is shown more clearly in FIGS. 5 and 6, comprises a carriage housing 14 with two wheel axles 15 each of which carries wheels 16. The carriage furthermore comprises a pivot 17 which extends perpendicularly with regard to the wheel axles 15 and has freely rotatably mounted on the lower end of pivot 17 a spacer ear 20 the purpose of which will be described further below. The pivotal movement of the pivot 17 is limited, for instance, by an abutment pin 18 and two abutment pins 19 arranged in housing 14.

Figure 3:
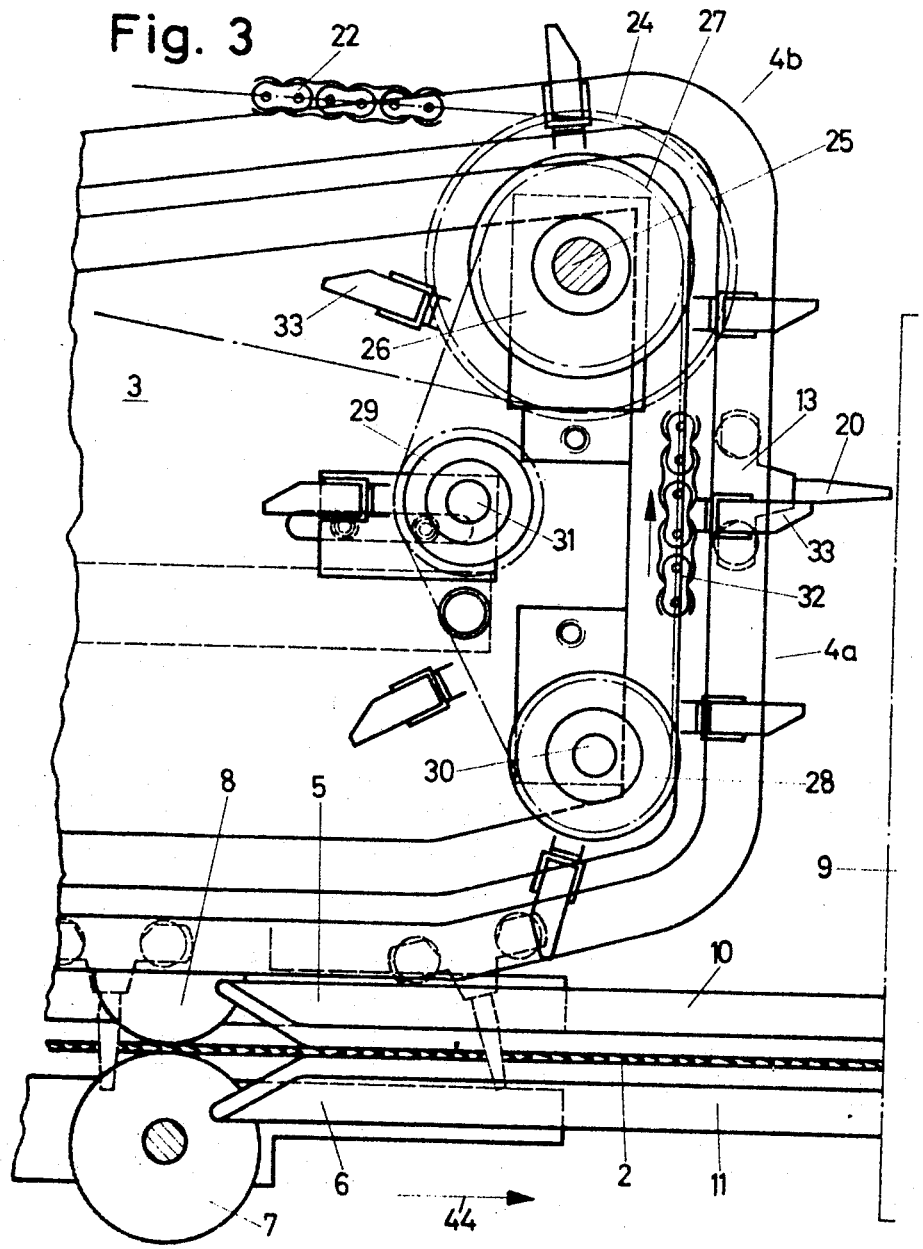
FIGURE 3 is a partial view of the right-hand portion of FIGURE 1 but on an enlarged scale with regard to FIGURE 1.
Figure 4:
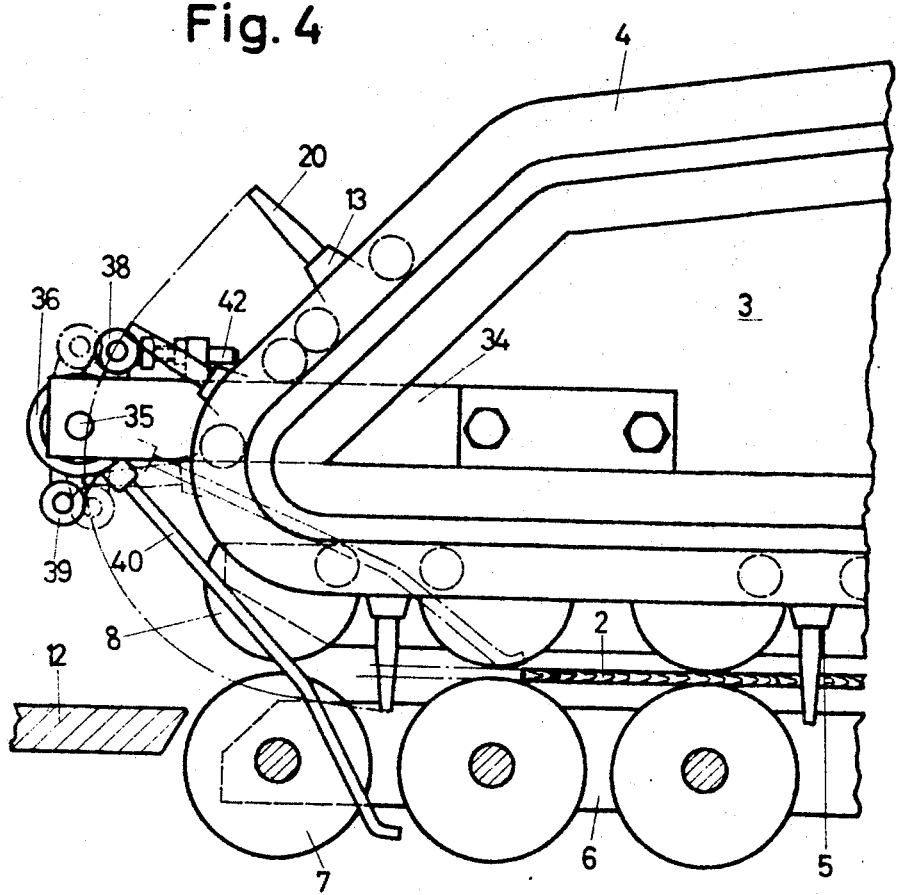
FIGURE 4 shows the left-hand portion of FIGURE 1 but on a larger scale than the latter.

Within the approximately vertical portion 4a of the carriage guiding rail 4 there is provided a feeding device for feeding the empty carriages to the highest portion 4b of the guiding rail 4 (FIG. 3). This last-mentioned feeding device comprises a motor 21 which is arranged on the transverse beam 1 and which is adapted by means of sprocket wheels 23 and 24 and a roller chain 22 to drive a drive shaft 25 journalled in bearings 26 on each of the supporting sheets 3. Drive shaft 25 extends over the entire width of the feeding device. With each of the carriage guiding rails 4, the shaft 25 carries a sprocket wheel 27 driving a roller chain 32 which in turn passes over a sprocket wheel 28 rotatably mounted on a pivot 30, and over a tensioning sprocket wheel 29 rotatable on a pivot 31. The tensioning device may be of any suitable construction.

The roller chain 32 carries a plurality of dogs 33 arranged in substantially equal distance from each other which are adapted to engage the carriages 13 laterally at the spacer ears 20 to thereby move the carriages.

At the uppermost portion 4a of the carriage guiding rail 4, the lifted carriages 13 will, during the downward movement of the dogs 33 be released and freed and will, by their own weight move toward the left (FIGS. 1 and 3) whereupon they pass into a control device (FIG. 4) for the release of the carriages 13, in conformity with the feeding of veneer strips 2.

The control device for the release of one carriage 13 each comprises a two-arm pivotable lever 36 which is journalled on a pivot 35 supported by an arm 34 of the supporting sheet 3. Lever 36 is biased by a tension spring 37. The lever 36 has two control pivots 38, 39 and a feeler lever 40. The tension spring 37 urges the lever 36 to rotate clockwise whereby on one hand, the feeler lever 40 which extends into the feeding path of the veneer sheets 2 to be conveyed, is tilted downwardly and on the other hand, the upper control pivot 38 is moved toward the right whereas the lower control pivot 39 is moved toward the left.

For precisely adjusting the pivotal movement of the lever 36, there is provided an abutment 41 located on lever 36 and an adjusting screw 42 with counter nut 43 arranged on the arm 34.

The number of the supporting sheets 3 with the carriage guiding rails 4 may be selected in conformity with the respective requirement. In the particular embodiment illustrated in the drawings, one supporting sheet 3 each with carriage guiding rail 4 and carriage lifting device and freeing means is arranged between each pair of guiding rails 5, 6.

The operation of the device according to the invention is as follows: The feeding goods 2 composed of individual veneer sheets provided with glue at the edges is manually introduced from the left-hand side into the direction of the arrow 44 (FIGS. 1 and 4) or may also be automatically introduced by any suitable mechanism, whereupon the goods pass from the driven lower feeder rollers 7 and the idling upper counter rollers 8 toward the right up to the entry into the rails 10 and 11 of the transverse joint gluing machine 9. When the feeding device is turned on, also the motor 21 for the carriage lifting device is put into operation. By means of the lifting device which is shown on an enlarged scale in FIG. 3, the carriages 13 are lifted in the approximately vertical portion 4a of the rail 4 and are collected in the leftwardly inclined portion of the guiding rail 4 in front of the carriage releasing means shown in FIG. 4. The spacer ear 20 of the foremost carriage 13 abuts the upper control pivot 38 whereupon the carriage 13 stops. All other carriages 13 then follow the first carriage while each carriages engages the preceding carriage.

If now, manually or mechanically, the goods 2 are introduced from the feeding table 12 (FIG. 4) between the transparent rollers 7 and 8, the feeler levers 40 against the thrust of spring 37 will be lifted by the work piece 2 into the position illustrated by dot-dash lines whereby the pivot lever 36 tilts in counter-clockwise direction. As a result thereof, the upper control pivot 38 moves toward the left and the lower pivot 39 moves toward the right. The spacer ear 20 of the first carriage 13 which was stopped by the pivot 38 becomes free, and the carriage moves until the same spacer ear 20 engages the lower pivot 39 which now is located on the right-hand side. When the feeler lever 40 reaches the end of the fed and now positively advanced veneer strip 2, said lever 40 will by means of spring 37 again be tilted downwardly. As a result, the lower pivot 39 is adjusted toward the left, and the spacer ear 20 of carriage 13 is free. Consequently, the carriage 13, due to its own weight, moves downwardly and the spacer ear 20 passes between the already advanced veneer sheet 2 and a further veneer sheet 2 to be fed. This operation is repeated with each veneer sheet to be fed. The feeding speed of the veneer sheets 2 is determined by the rollers 7, 8 or the working speed of is determined by the rollers 7, 8 or the working speed of the transverse joint gluing machine 9 employed in connection therewith. The carriages 13 freely move into the guiding rails 4, and the spacer ears 20 thus merely serve the purpose of holding a slight distance between the individual fed veneer sheets 2 up to a point where the veneer sheets are grasped by the rails 10 and 11 of the joint gluing machine 9.

FIG. 3 illustrates how the carriage 13 with its spacer ears 20 is lifted through the course of the guiding rails 4 so that the spacer ear 20 moves out of the space between two adjacent succeeding veneer sheets 2. The carriage 13 is now in the portion 4a of the guiding rail 4 grasped by one of the dogs 33 of the continuously circulating roller chain 32 and is lifted vertically into the uppermost portion 4b from where it passes in the manner described above to the feeding side of the material to be fed.

The additional veneer sheet, which up to that time has been held slightly spaced from the preceding veneer sheet 2, is by means of rails 10 and 11 pulled into the transverse joint gluing machine while the edges to be glued together are firmly pressed against each other. The said gluing machine does not form a part of the present invention so that a further description thereof does not appear to be necessary.

The advantage of the veneer sheet feeding device according to the invention over heretofore known devices of the type involved, consists in that a plurality of veneer sheets, regardless of the speed of the joint gluing machine, can be introduced into the device. The individual sheets are, until their introduction into the joint gluing machine, fed with parallel gluing edges but slightly spaced from each other. As a result thereof, each mutual contact is avoided of the edges having glue applied thereto up to the time when the sheets enter the joint gluing machine, at which time the edges are pressed against each other and the setting of the glue will occur.

It is, of course, to be understood, that the present invention is, by no means, limited to the particular construction shown in the drawings, but also comprises any modifications within the scope of the appended claims.

What is claimed is:

1. A veneer feeding device for feeding veneer pieces which are to be glued in edge to edge relation; said device comprising a first end where veneer pieces are supplied thereto and a second end where veneer pieces are discharged therefrom to a gluing station, upper and lower rail means extending in the direction of movement of the veneer pieces and forming a path between which the veneer pieces are fed from said first end toward second end for supply to a gluing station, feed means adjacent said rail means for advancing veneer pieces along the path formed by said rail means, endless guiding rail means above the path of the veneer pieces and each disposed in a plane substantially perpendicular to the plane of veneer pieces moving along said path, each endless guiding rail means having a lower portion parallel to said path and an upper portion and end portions connecting said lower and upper portions, a plurality of carriage members freely moveable along each guide rail, each carriage member including a spacer member which projects across said path when the respective carriage member is on the lower portion of the guiding rail means so the spacer member is interposed between the adjacent ends of veneer pieces moving along said path in adjacent relation, lift means adjacent the one end portion of said guiding rail means nearest said second end of the device for moving the carriage members up the respective end portion to said top portion, said carriage members being moveable along said top portion from the last mentioned said end portion to the other said end portion, and release means adjacent the said other end portion of said guiding rail means nearest said first end of the device for releasing a carriage member at the trailing end of each veneer piece introduced into said first end of the device, said release means being operated by the movement of the veneer pieces into said device.

2. A device according to claim 1 in which said top portion of said guiding rail means inclines downwardly toward said other end portion and the carriage members slide along the said top portion by gravity toward said other end portion.

3. A device according to claim 2 in which said lower portion of said guiding rail means at the end thereof nearest said second end of the device is inclined upwardly so as to move said spacer members upwardly out of said path as the veneer pieces leave said second end of the device.

4. A device according to claim 2 in which said lift means comprises an endless chain having one reach parallel to said one end portion of the guiding rail means, spaced dog elements on said chain which engage said carriage members near the end of said lower portion of the guiding rail means and move the carriage elements to and upwardly along said one end portion of said guiding rail means and therefrom to and on said upper portion of said guiding rail means.

5. A device according to claim 2 in which said release means comprises a stop member moveably supported adjacent said other end portion of said guiding rail means to engage and stop the carriage member on said other end portion which is in position to move to said lower portion of the guiding rail means, a feeler element connected to said stop member and projecting into said path so as to be moved by a veneer piece fed into said device and released when the trailing end of the said veneer piece moves into the device, said feeler element holding said stop member in carriage stopping position while the feeler element engages a veneer piece and permitting said stop member to move to carriage releasing position when the feeler element is released from the veneer piece at the trailing end of the veneer piece whereby a carriage member moves to said lower portion of said guiding rail means to the lower portion thereof at the trailing end of each veneer piece fed into the device.

6. A device according to claim 5 in which said stop member is a two armed lever having a lower end which is in position to engage and stop the carriage member next to move from said other end portion of the guiding rail means to the lower portion thereof when said feeler element is resting on a veneer piece moving along said path and said lever having an upper end which is in position to engage and stop the next following carriage member in said other end portion when said feeler element is released from said veneer piece at the trailing end thereof.

7. A device according to claim 6 in which a spring is provided urging said stop member toward the last mentioned position.

8. A device according to claim 2 in which said spacer member is a blade-like element adapted to rest flat between the adjacent edges of adjacent veneer pieces, and means supporting each said blade-like element on its respective carriage member for limited rotary movement about an axis perpendicular to the plane of the veneer piece.

References Cited

UNITED STATES PATENTS

| | | | |
|---|---|---|---|
| 3,236,162 | 2/1966 | Reist | 271—68 |
| 3,266,614 | 8/1966 | Griner | 198—34 |

RICHARD E. AEGERTER, *Primary Examiner.*